United States Patent
Matsunaga et al.

(10) Patent No.: US 7,855,850 B2
(45) Date of Patent: Dec. 21, 2010

(54) METHOD AND APPARATUS FOR HEAD POSITIONING USING SPIRAL SERVO PATTERNS IN A DISK DRIVE

(75) Inventors: Toshitaka Matsunaga, Akishima (JP); Masahide Yatsu, Akishima (JP); Hideo Sado, Ome (JP); Katsuki Ueda, Tachikawa (JP); Shouji Nakajima, Kodaira (JP); Seiji Mizukoshi, Nishitama-gun (JP); Shinichirou Kouhara, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 12/146,622

(22) Filed: Jun. 26, 2008

(65) Prior Publication Data

US 2009/0002871 A1 Jan. 1, 2009

(30) Foreign Application Priority Data

Jun. 29, 2007 (JP) .............................. 2007-173044

(51) Int. Cl.
*G11B 21/12* (2006.01)
(52) U.S. Cl. ...................................................... 360/75
(58) Field of Classification Search ...................... None
See application file for complete search history.

(56) References Cited

U.S. PATENT DOCUMENTS

| 6,987,636 | B1 * | 1/2006 | Chue et al. ..................... 360/75 |
| 7,068,459 | B1 | 6/2006 | Cloke et al. |
| 7,088,533 | B1 * | 8/2006 | Shepherd et al. ............... 360/75 |
| 7,248,426 | B1 * | 7/2007 | Weerasooriya et al. ......... 360/75 |
| 7,312,943 | B2 * | 12/2007 | Lau et al. ....................... 360/75 |
| 7,375,918 | B1 * | 5/2008 | Shepherd et al. ......... 360/78.14 |
| 7,471,481 | B2 * | 12/2008 | Lau et al. ....................... 360/75 |
| 7,477,472 | B2 * | 1/2009 | Sado et al. ..................... 360/75 |
| 2007/0253084 | A1 * | 11/2007 | Annampedu et al. .......... 360/75 |

FOREIGN PATENT DOCUMENTS

| JP | 02-056784 | 2/1990 |
| JP | 2003-217241 | 7/2003 |

* cited by examiner

*Primary Examiner*—Hoa T Nguyen
*Assistant Examiner*—James L Habermehl
(74) *Attorney, Agent, or Firm*—Pillsbury Winthrop Shaw Pittman, LLP

(57) ABSTRACT

According to one embodiment, a disk drive having a disk, a read head, a servo controller, and a CPU. In the disk, a multi-spiral servo pattern is recorded. The read head reproduces a hexagon-shaped detection signal from the multi-spiral servo pattern. The servo controller generates amplitudes values for respective frames, from the multi-spiral servo pattern. The CPU performs positional-error calculation by using the amplitude values for the frames. Upon detecting a positional change of the head is detected, the CPU performs the positional-error calculation by using the amplitude values generated at the time of replacing the frames with other frames, and corrects the positional error by adding an offset determined from the positional change of the head, to the result of the positional-error calculation.

11 Claims, 13 Drawing Sheets

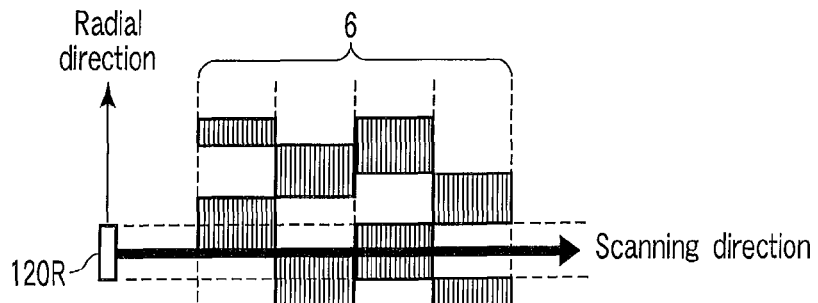
FIG. 5A
FIG. 5B
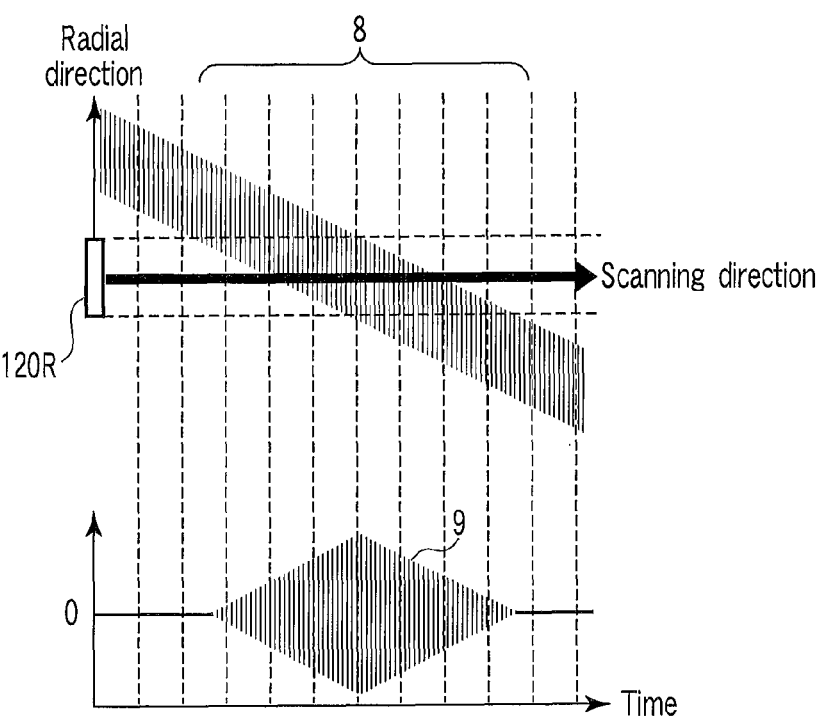
FIG. 6A
FIG. 6B

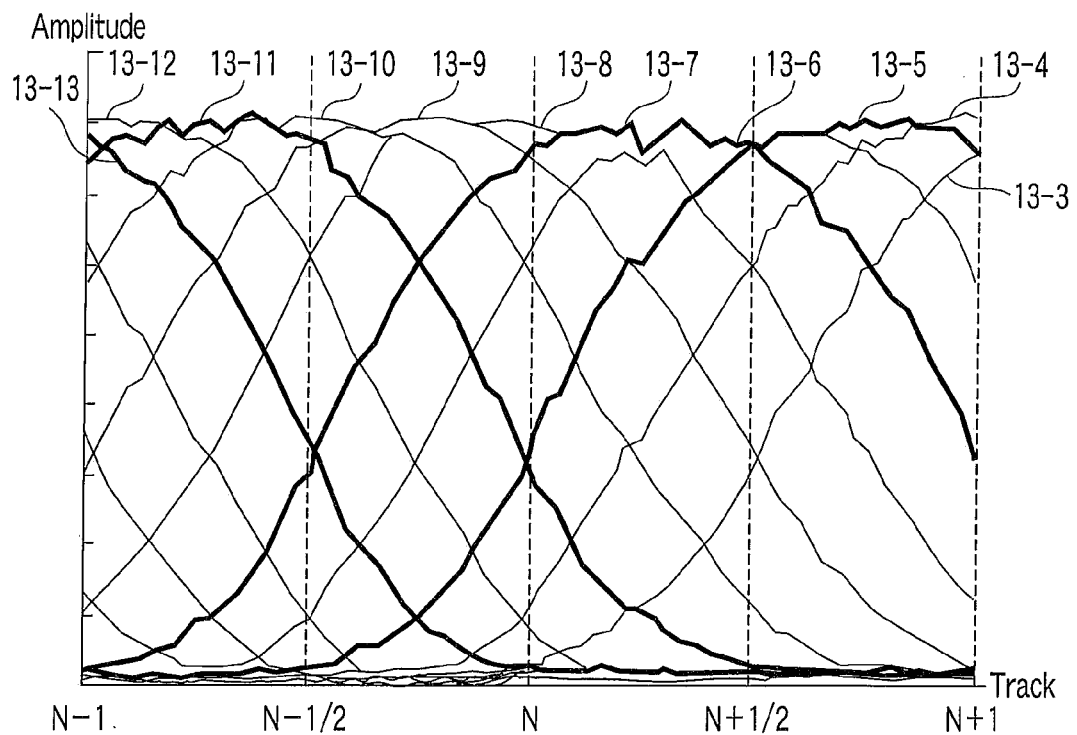
F I G. 11
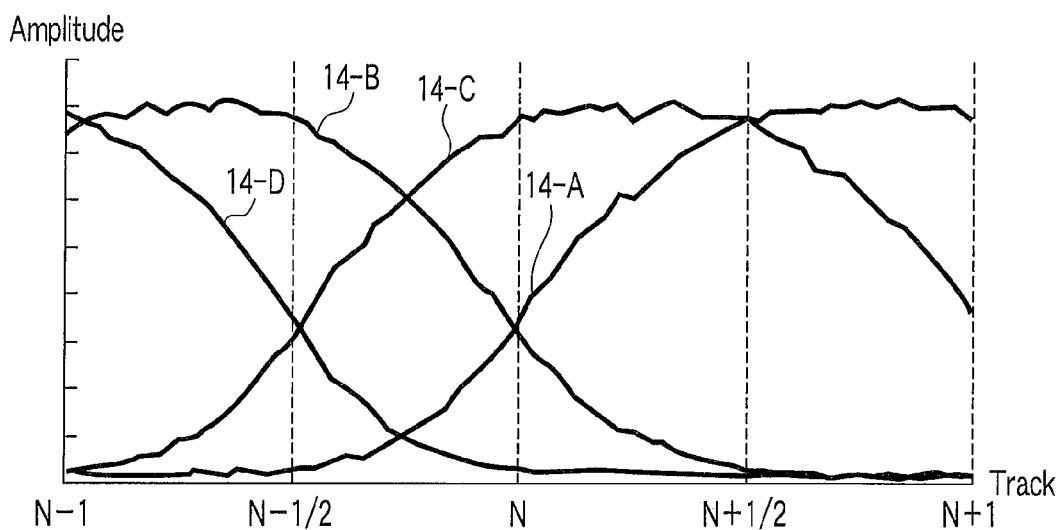
F I G. 12

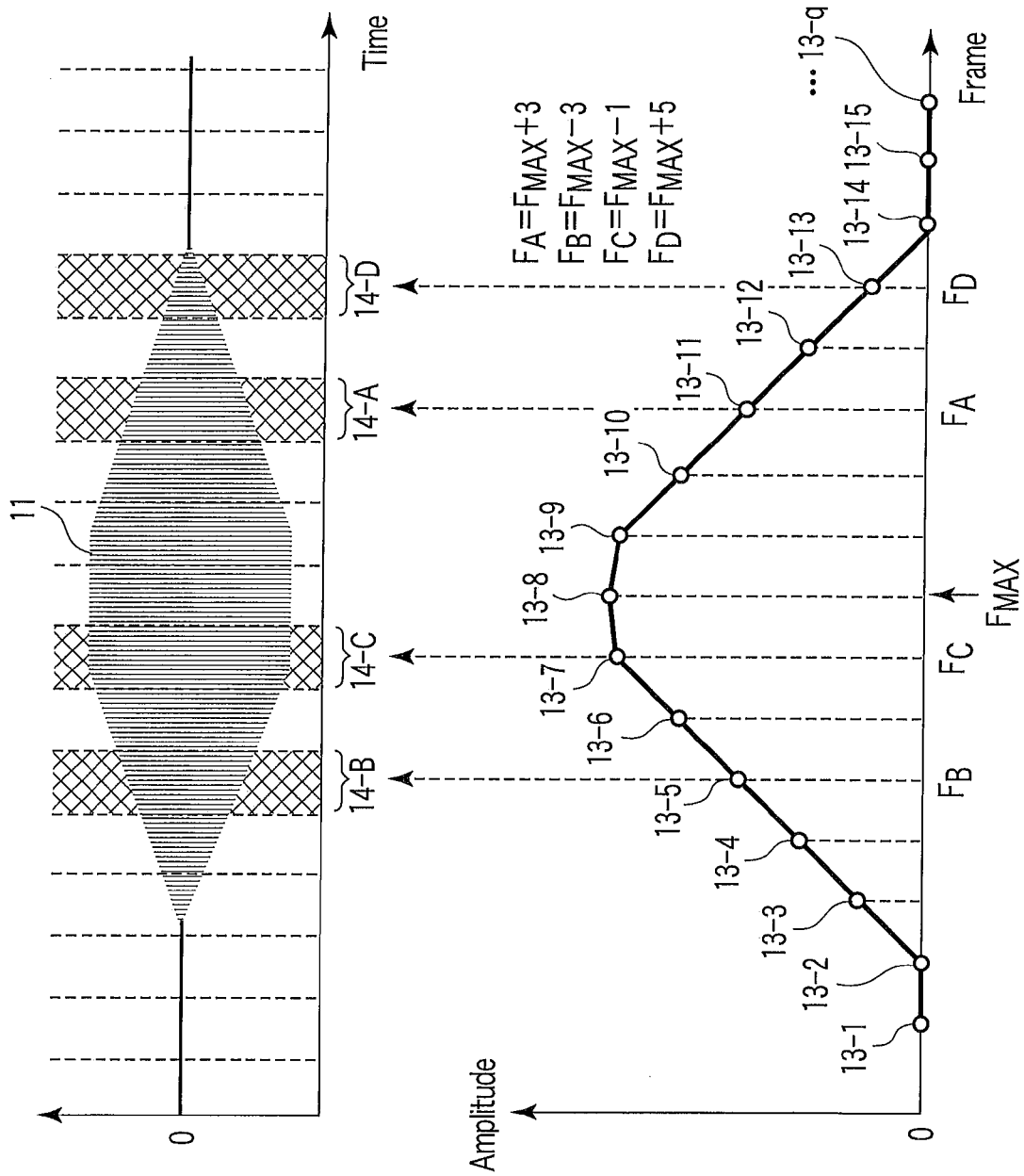
F I G. 15A
F I G. 15B

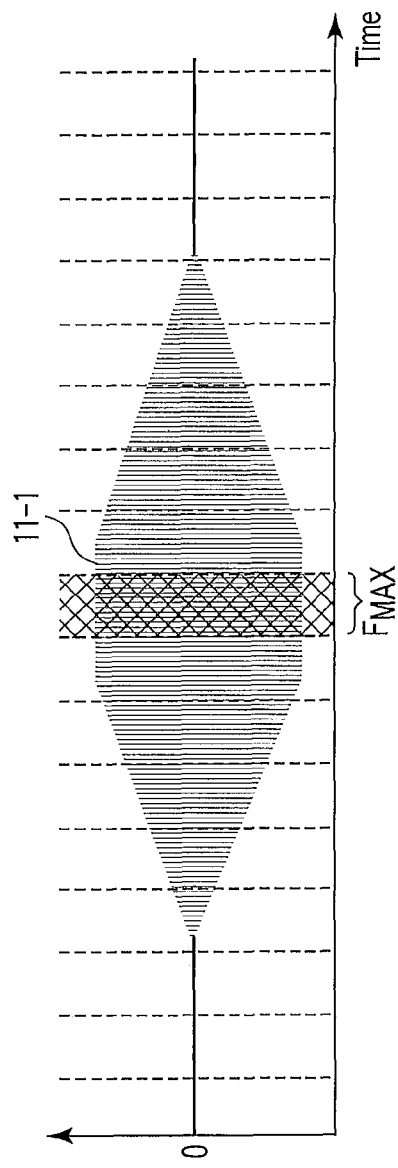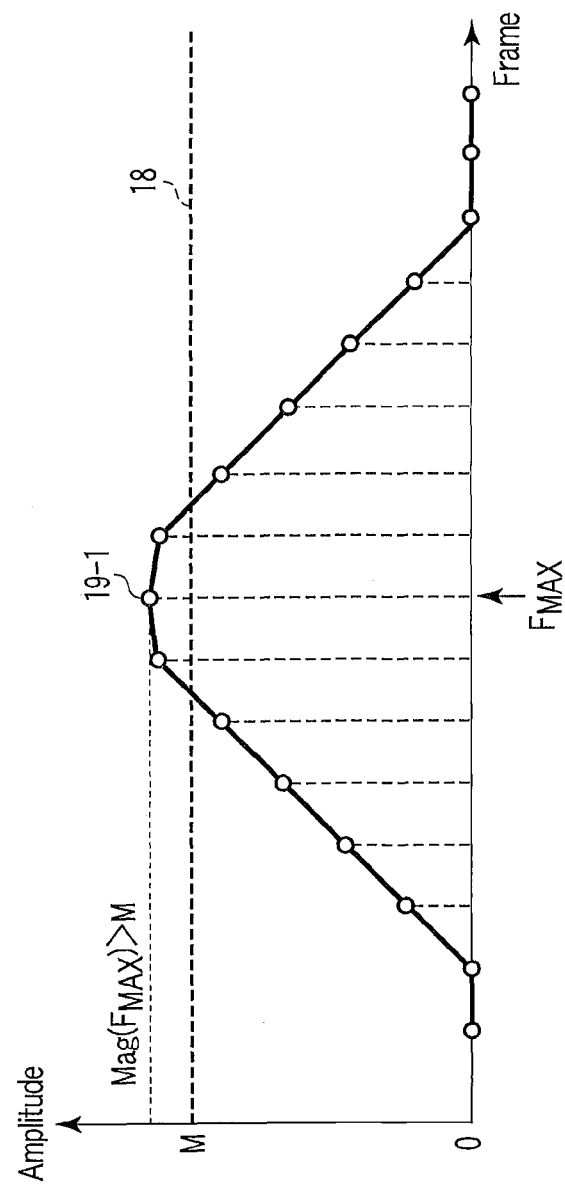
F I G. 16A
F I G. 16B

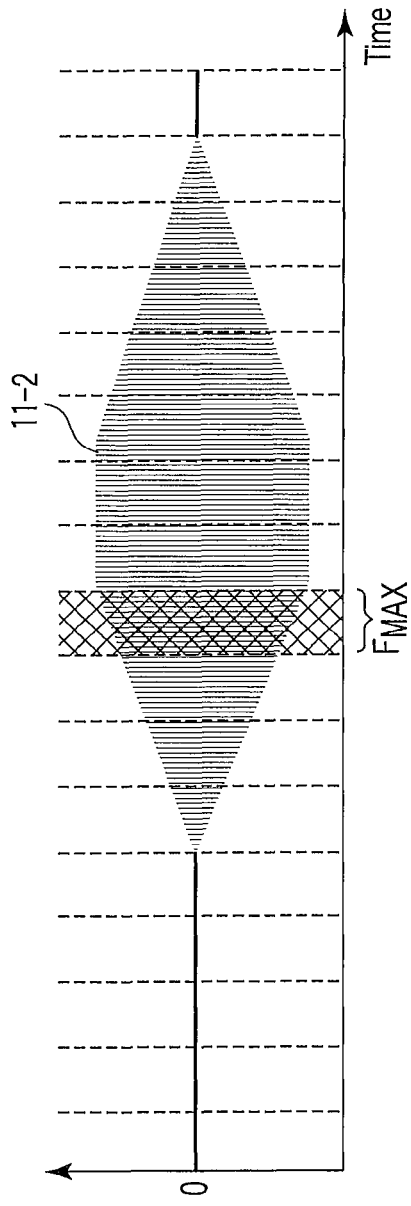
F I G. 17A
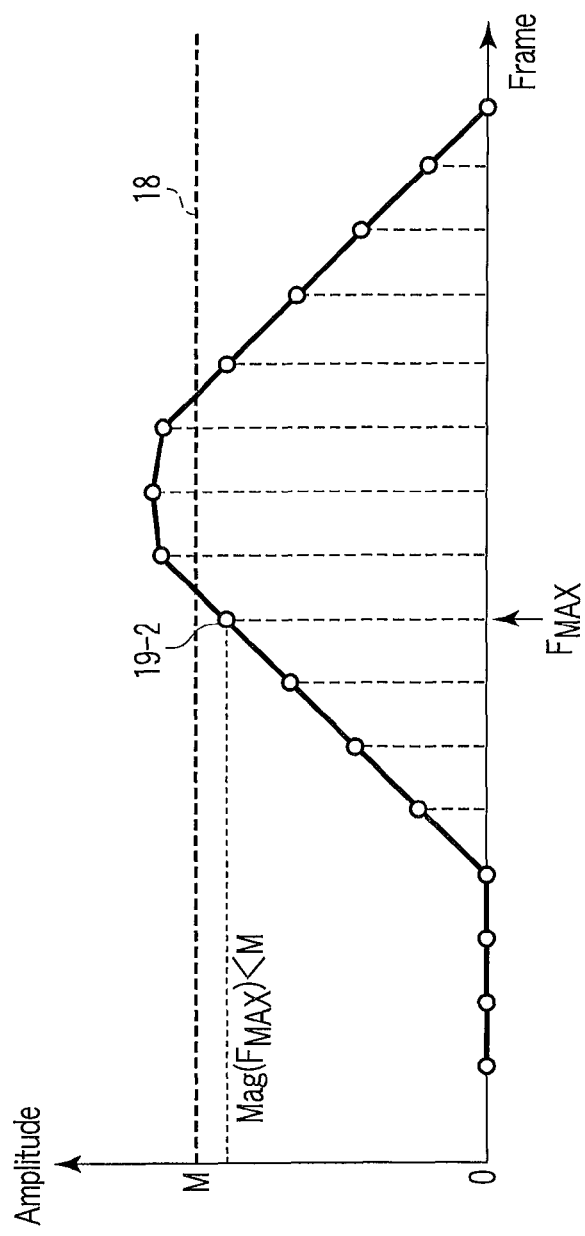
F I G. 17B

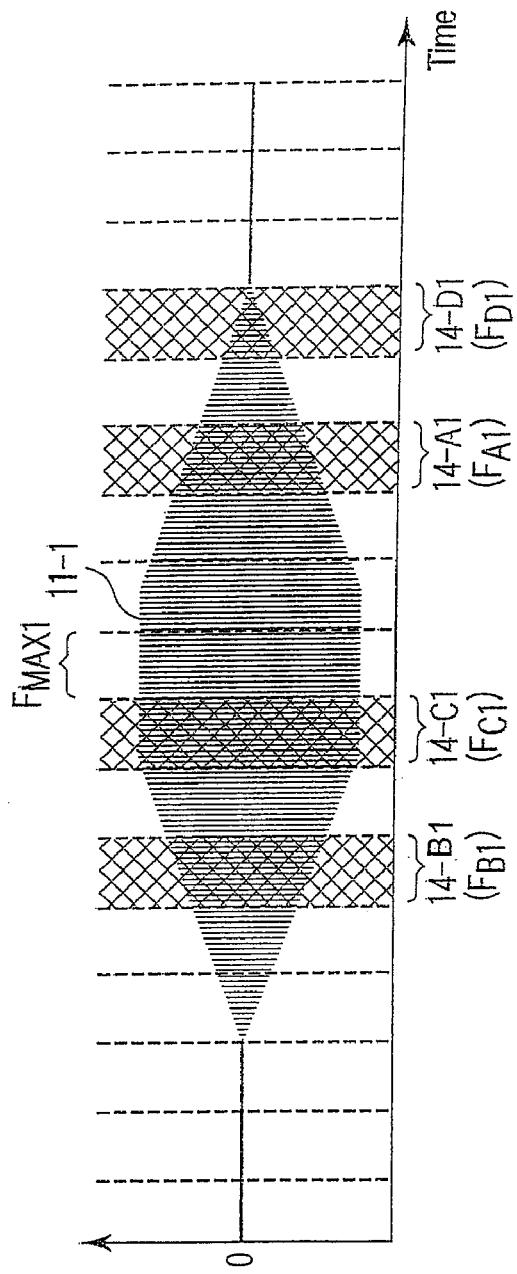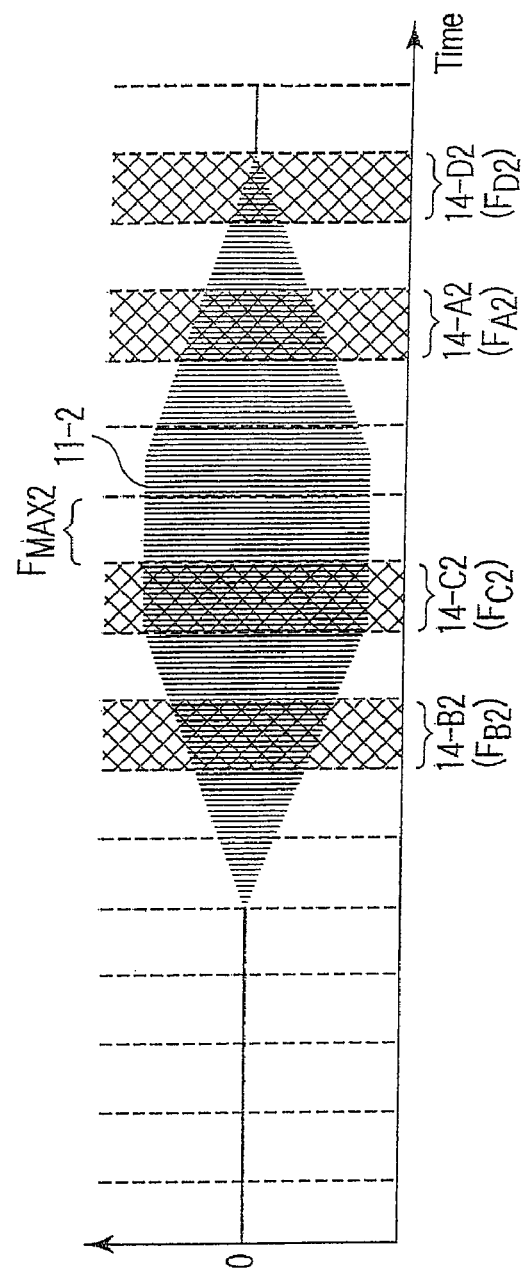
FIG. 18A
FIG. 18B

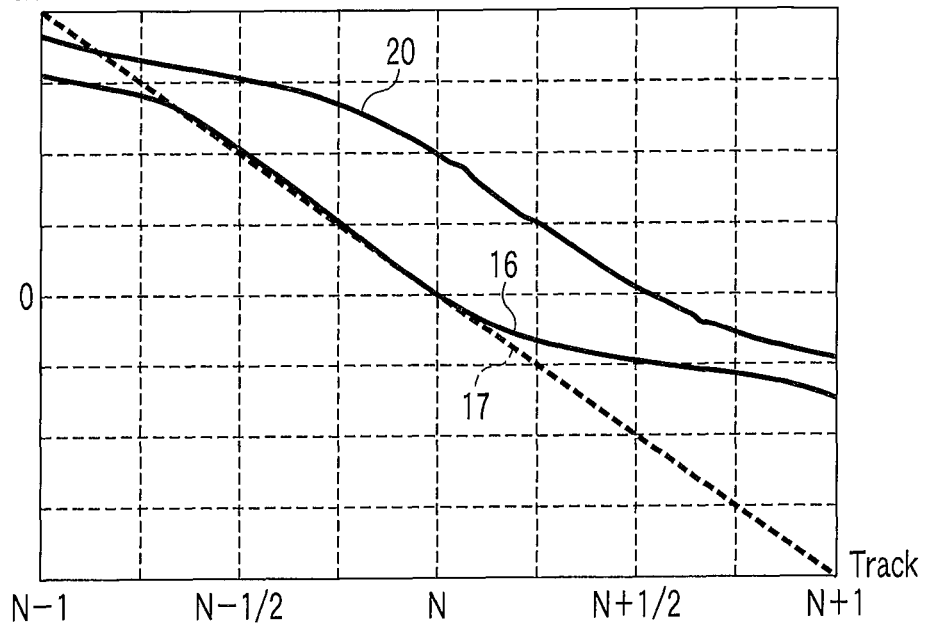
F I G. 19
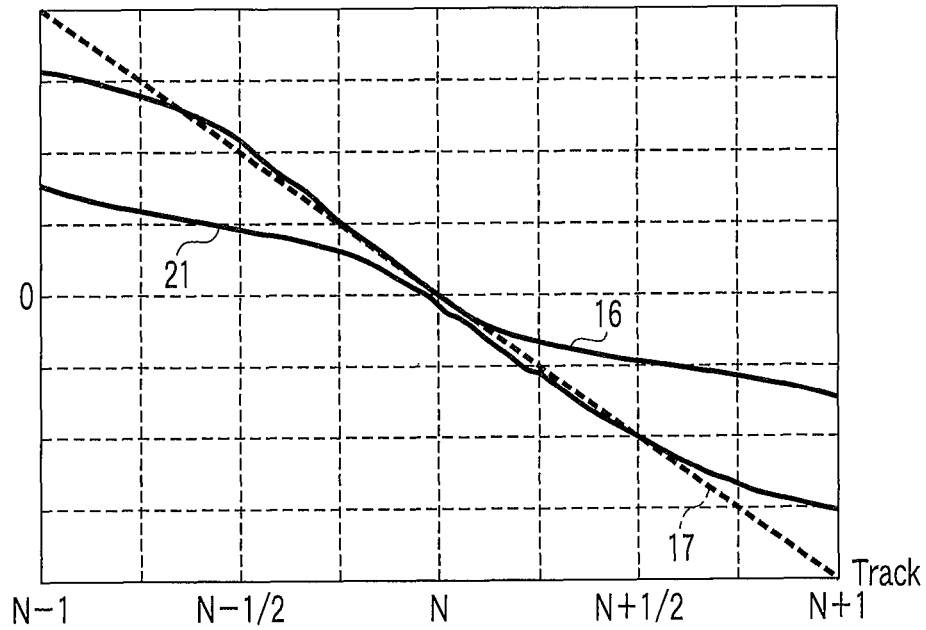
F I G. 20

METHOD AND APPARATUS FOR HEAD POSITIONING USING SPIRAL SERVO PATTERNS IN A DISK DRIVE

CROSS-REFERENCE TO RELATED APPLICATIONS

This application is based upon and claims the benefit of priority from Japanese Patent Application No. 2007-173044, filed Jun. 29, 2007, the entire contents of which are incorporated herein by reference.

BACKGROUND

1. Field

One embodiment of the present invention relates to a disk drive. More particularly, the invention relates to a technique of controlling the positioning of the head, by using spiral servo patterns.

2. Description of the Related Art

In most disk drives, a representative example of which is a hard disk drive, a servo pattern (servo data) that is used to control the positioning of the head is recorded on a disk, which is a data-recording medium. The servo pattern is used to move the head to a target position (i.e., target track) over the disk.

The servo pattern recorded in the disk consists of a plurality of servo sectors. In most cases, the servo sectors are arranged at regular intervals in the circumferential direction of the disk. The servo sectors extend in the radial direction of the disk, constituting concentric servo tracks. The servo pattern, which consists of radial servo sectors (or concentric servo tracks), has been recorded in the disk by performing a servo write operation during the manufacture of the disk drive.

In recent years, it has been proposed that a plurality of spiral servo patterns be recorded in a disk as base pattern (seed pattern), and that a plurality of radial servo patterns be also in the disk based on the spiral servo patterns (i.e., multi-spiral servo pattern). (See, for example, U.S. Pat. No. 7,068,459 B1.)

In this case, the radial servo patterns are servo patterns (hereinafter referred to as product servo patterns, whenever necessary) that are used when the disk drive is used after shipped as a product from the manufacturer. Hence, the multi-spiral servo pattern is finally erased from the disk by over-writing data.

In most cases, a disk having a multi-spiral servo pattern recorded in it is incorporated into the disk drive, and then the disk drive performs a self-servo write operation, writing radial servo patterns (i.e., product servo patterns) in the disk.

When the read head included in the head reads the multi-spiral servo pattern, it generates a detection signal. Based on the detection signal, the disk drive calculates a positional error in order to control the head positioning in preparation for the recording of radial servo patterns. In most disk drives, the head has a read head for reading the servo patterns and a write head for writing the servo patterns, which are spaced from each other. The read head is less wide than the write head. Therefore, the detecting signal the read head outputs upon reading the multi-spiral servo pattern has a hexagonal shape.

The method of calculating the positional error, which is performed to control the head positioning, is an operation (algorithm) that is based on the radial servo patterns. It is desired that the hexagon-shaped detection signal be used in this method of calculating the positional error.

While the positional error is being calculated, the position of the head over the disk may greatly change due to disturbances. In this case, the positional error calculated may not be sufficiently accurate if the detection signal is used, which the read head has output upon reading the multi-spiral servo pattern.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 5A and 5B are diagrams explaining the burst signals defining the radial servo patterns according to the embodiment;

FIGS. 6A and 6B are diagrams explaining detection signals that are generated when the multi-spiral servo pattern is read from the disk;

FIG. 11 is a diagram illustrating how hexagon-shaped detection signals for respective frames change in amplitude in the embodiment;

FIG. 12 is a diagram illustrating how hexagon-shaped detection signals for some selected frames change in amplitude in the embodiment, with respect to the radial direction of the disk;

FIGS. 15A and 15B are diagrams explaining the relation a detection signal and a frame have in the embodiment;

FIGS. 16A and 16B are diagrams explaining the relation a detection signal and amplitude have in the embodiment;

FIGS. 17A and 17B are diagrams explaining the relation a detection signal and an amplitude have as the head positional changes in the present embodiment;

FIGS. 18A and 18B are diagrams explaining how a positional error is detected as the head positional changes in the present embodiment;

FIG. 19 is a diagram explaining the result of positional-error calculation performed in the embodiment; and FIG. 20 is a diagram explaining how the positional-error calculation is corrected in the embodiment.

DETAILED DESCRIPTION

Various embodiments according to the invention will be described hereinafter with reference to the accompanying drawings. In general, according to one embodiment of the invention, there is provided a disk drive which the head positioning is controlled in accordance with a positional error calculated by using detection signal the head generates upon reading the multi-spiral servo pattern recorded in the disk, and in which the head positioning can be accurately controlled even if the position of the head greatly changes.

(Configuration of the Disk Drive)

Figure 1:
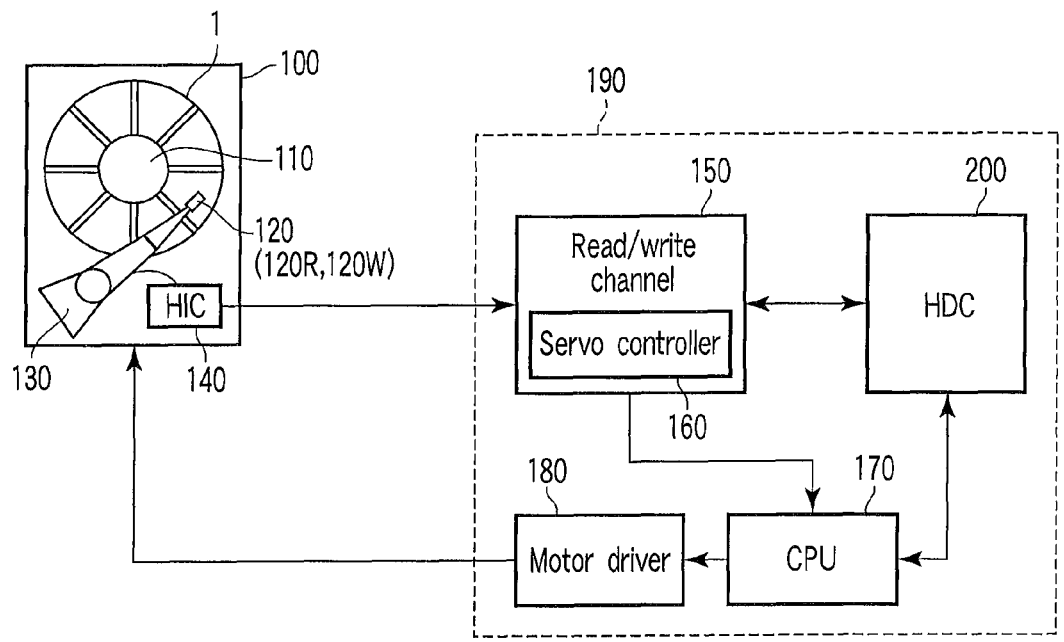
FIG. 1 is a block diagram showing the major components of a disk drive according to an embodiment of the present invention.

According to an embodiment, FIG. 1 shows a block diagram showing the major components of a disk drive 100.

As FIG. 1 shows, the disk drive 100 has a disk 1, a spindle motor 110, a head 120, an actuator 130, a head amplifier (head IC) 140, and a printed circuit board (PCB) 190.

Figure 3:
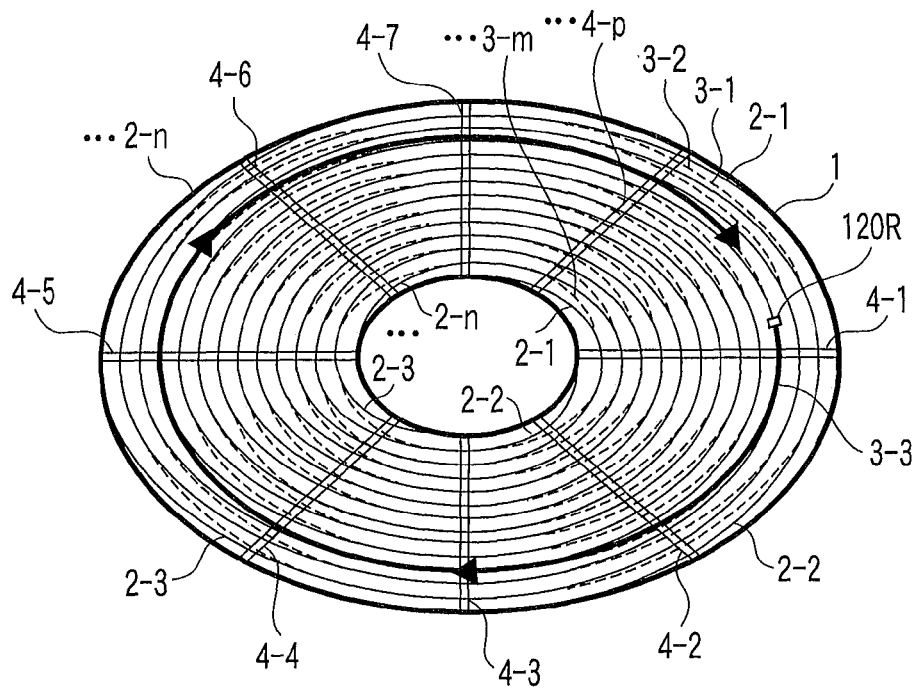
FIG. 3 is a diagram illustrating a disk according to the embodiment, which has a multi-spiral servo pattern recorded in it.

The spindle motor 110 rotates the disk 1 at high speed. As shown in FIG. 3, a multi-spiral servo pattern is recorded by a servo track writer (STW), described later) in the disk 1 as is illustrated in FIG. 3. The multi-spiral servo pattern consists of spiral servo patterns that are used as base pattern.

The head 120 includes a read head 120R and a write head 120W. The read head 120R reads the multi-spiral servo pattern, radial servo patterns and user data from the disk 1. The write head 120W writes user data in the data areas of the disk 1, other than the servo sectors provide on the disk 1. The write head 120W also writes radial servo patterns in the servo sectors, when a self-servo write operation as will be explained later is performed.

The actuator 130 holds the head 120 and is driven by a voice coil motor (VCM), thus moving the head 120 in the radial direction of the disk 1. The voice coil motor is driven and controlled by a motor driver 180 that is mounted on the PCB 190. The head amplifier 140 amplifies a read signal read by the read head 120R. The read signal amplified is output to a read/write channel (signal-processing unit) 150 that is mounted on the PCB 190, too.

The PCB 190 holds a micro processor (CPU) 170 and a disk controller (HDC) 200, as well as the read/write channel 150 and the motor driver 180. The read/write channel 150 is a signal-processing unit configured to process read signals and write signals. The read/write channel 150 includes a servo controller 160 that reproduces servo signals from the multi-spiral servo pattern and from the radial servo patterns.

The servo controller 160 includes an address-code detecting unit, a servo-burst-signal demodulating unit, and a servo-data reproducing unit. The address-code detecting unit detects, from a read signal, the address codes of the sector and track (cylinder), which are contained in each radial servo pattern. The servo-burst-signal demodulating unit demodulates signals detected from the multi-spiral servo pattern and the servo-burst signals contained in the radial servo patterns. The servo-data reproducing unit generates positional-error data from the address code detected by the address-code detecting unit and the servo-burst signals (A to D). The positional-error data thus generated is output to the CPU 170.

The motor driver 180 includes a VCM driver and a SPM driver. Controlled by the CPU 170, the VCM driver supplies a drive current to the voice coil motor of the actuator 130. Controlled by the CPU 170, too, the SPM driver supplies a drive current to the spindle motor 110.

The HDC 200 is an interface that performs data transfer between the disk drive 100 and an external host system. Controlled by the CPU 170, the HDC 200 transfers the user data output from the read/write channel 150, to the host system. Further, the HDC 100 also receives data from the host system and transfers the data to the read/write channel 150. The data coming from the host system contains the data representing the radial servo patterns that are to be written in the disk 1 by means of a self-servo write operation.

The CPU 170 is the main controller in the disk drive 100. The CPU 170 has the function of performing a self-servo write operation according to the present embodiment. After the disk drive 100 has been shipped as a product, the CPU 170 controls the positioning of the head 120, in accordance with the radial servo patterns (i.e., product servo patterns) written in the disk 1.

(Configuration of the Servo Track Writer)

Figure 2:
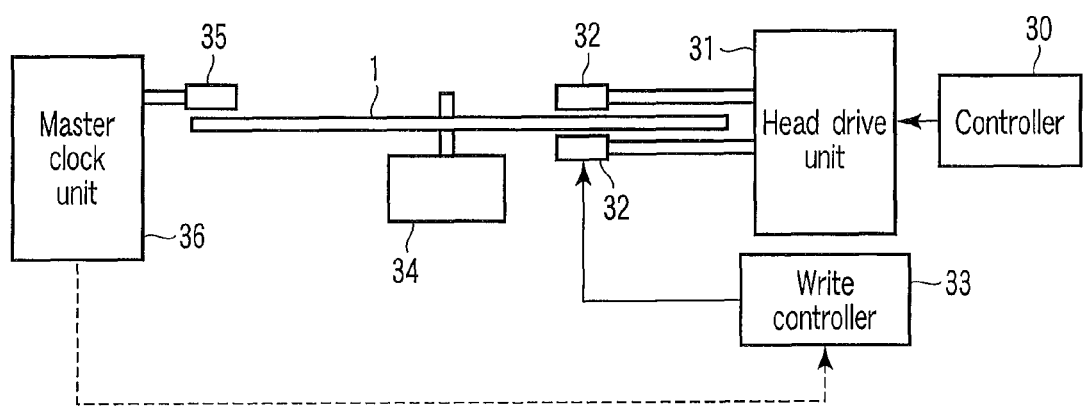
FIG. 2 is a block diagram showing the major components of a servo track writer according to the embodiment.

FIG. 2 is a block diagram showing the major components of the servo track writer (STW) according to the present embodiment. The servo track writer (STW) is provided in a clean room. It is an apparatus dedicated for writing, in the disk 1, the multi-spiral servo pattern that is used as base pattern, before the self-servo write operation is performed.

As FIG. 2 shows, the servo track writer has a controller 30, a head drive unit (drive mechanism) 31, a servo head 32, a write controller 33, a spindle motor 34, a clock head 35, and a master clock unit 36.

The spindle motor 34 rotates the disk 1 in which no data is written at all. The servo head 32 is mounted on a slider and comprises a read head and a write head, which are spaced apart from each other. The read head of the servo head 32 reads the multi-spiral servo pattern from a disk. The write head of the servo head 32 writes this multi-spiral servo pattern in the disk 1.

The controller 30 has a microprocessor and a memory as its major components. The controller 30 controls the head drive unit 31, write controller 33, spindle motor 34 and master clock unit 36. The controller 30 controls the head drive unit 31, which in turn controls the positioning of the servo head 32.

The head drive unit 31 is an actuator that holds the servo head 32 is driven by a voice coil motor, to move the servo head 32 to any designated position over the disk 1. The write controller 33 supplies servo data to the servo head 32. The servo head 32 writes multi-spiral servo pattern in the disk 1 as shown in FIG. 3, on the basis of the servo data supplied from the write controller 33.

Controlled by the controller 30, the master clock unit 36 supplies a clock signal to the clock head 35. The clock head 35 writes a clock signal in the outermost circumferential zone of the disk 1. The controller 30 refers to this clock signal as reference-position data signal, while the servo head 32 is being moved from the innermost circumferential region of the disk 1 to the outermost circumferential region thereof.

(Multi-Spiral Servo Pattern)

A multi-spiral servo pattern and a detection signal, both pertaining to the present invention, will be described with reference to FIG. 4 and FIGS. 6A and 6B.

FIG. 3 is a conceptual representation of a multi-spiral servo pattern that is written in the entire surface of the disk 1. The multi-spiral servo pattern consists of n spiral servo patterns 2-1 to 2-n. The multi-spiral servo pattern has been written by, for example, a servo track writer of such a type as shown in FIG. 2.

In the disk drive 100, the self-servo write operation is performed after the disk 1 having the multi-spiral servo pattern recorded in it has been incorporated into the disk drive 100. Radial servo patterns 4-1 to 4-p are thereby written in the disk 1. The CPU 170 uses the spiral servo patterns 2-1 to 2-n, writing the radial servo patterns 4-1 to 4-n, while causing the head 120 to move along concentric tracks 3-1 to 3-m (more precisely, the centerlines of the tracks) indicated by broken lines in FIG. 3. In FIG. 3, the arrows show how the read head 120R scans the concentric track 3-3.

Figure 4:
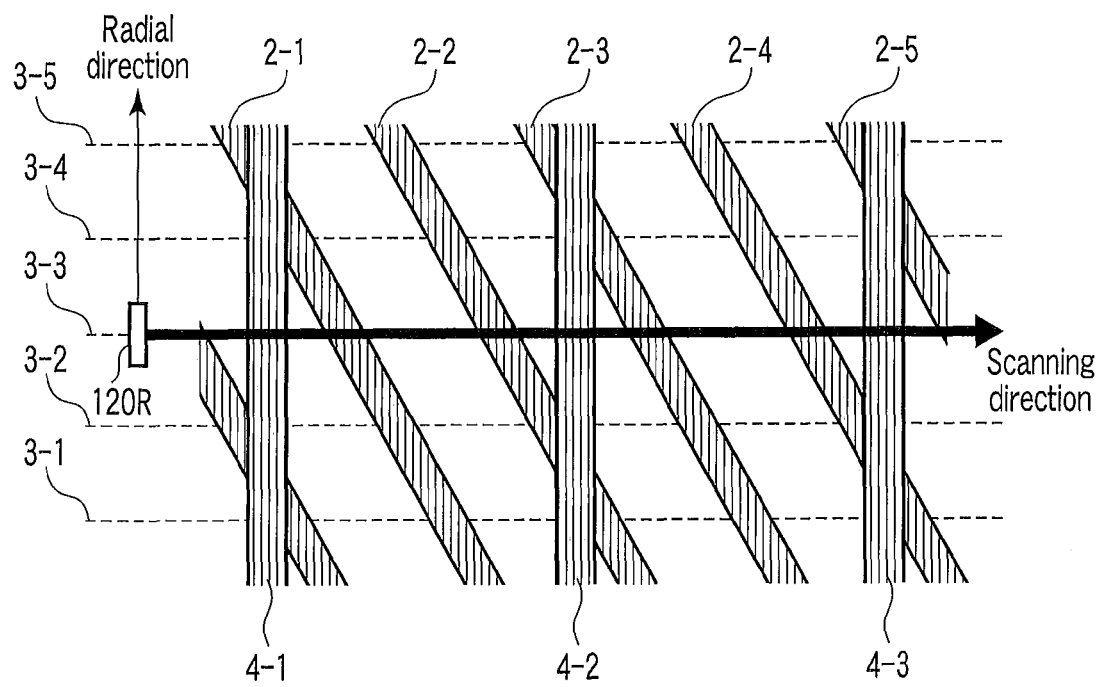
FIG. 4 is a diagram representing the positional relation between the multi-spiral servo pattern and the radial servo patterns, all pertaining to the embodiment.

FIG. 4 is a diagram representing the positional relation between the spiral servo patterns 2-1 to 2-5 and the radial servo patterns 4-1 to 4-3. As seen from FIG. 4, the radial servo patterns 4-1 to 4-3 are vertical to the direction in which the read head 120R scans the concentric track 3-3 (i.e., circumferential direction of the disk 1, indicated by the arrow). By contrast, the multi-spiral servo patterns 2-1 to 2-5 extend oblique to the direction in which the read head 120R scans the concentric track 3-3. The timing at which the read head 120R reads one spiral servo pattern differs from the timing at which the head 120R reads another spiral servo pattern, because the head 120R is moving in the radial direction of the disk 1.

After the radial servo patterns 4-1 to 4-3 have been written in the disk 1, the positioning of the read head 120R is controlled in accordance with the radial servo patterns 4-1 to 4-3 so that it may be positions at the centerlines 3-1 to 3-5 of the concentric tracks.

FIG. 5A shows a region 6 in which the servo-burst signals (A to D) are contained in the radial servo patterns 4-1 to 4-p. FIG. 5B shows the amplitudes 7-A to 7-D of the servo-burst signals (A to D) the read head 120R reproduces when it passes over the servo-burst signal region 6. The amplitudes 7-A to 7-D are output by the servo controller 160 of the read/write channel 150.

The CPU 170 determines the position the read head 120R assumes in the radial direction of the disk 1, from the changes in the amplitudes 7-A to 7-D of the servo-burst signals (A to D). That is, the read head 120R is determined to lie on the centerlines 3-1 to 3-m of the concentric tracks when the amplitudes 7-A and 7-B of servo-burst signals A and B are identical to each other. The positional deviation of the read head 120R from the centerline of any concentric track will be called a positional error hereinafter.

The CPU 170 uses the amplitudes 7-A to 7-D of the servo-burst signals (A to D), calculating a positional error of the read head 120R. In accordance with the positional error calculated, the CPU 170 controls the positioning (tracking) of the read head 120R.

More specifically, the CPU 170 performs an operation of the following algorithm to find the positional error of the read head 120R:

$$pos1=(A-B)/(|A-B|+|C-D|) \quad (1)$$

$$pos2=((A-B)*|A-B|)/(|A-B|^2+|C-D|^2) \quad (2)$$

$$POS=((pos1*k)+((1024-k)*pos2))/1024 \quad (3)$$

Where POS is a positional error obtained by performing an averaging operation in which a weighting coefficient (k: 0 to 1024) are added to the solutions of the equations (1) and (2). In the equations (1) and (2), A to D are the amplitudes of the servo-burst signals, |X| is the absolute value for X, Y^2 means the squaring of Y, and * means multiplication.

Figure 7A:
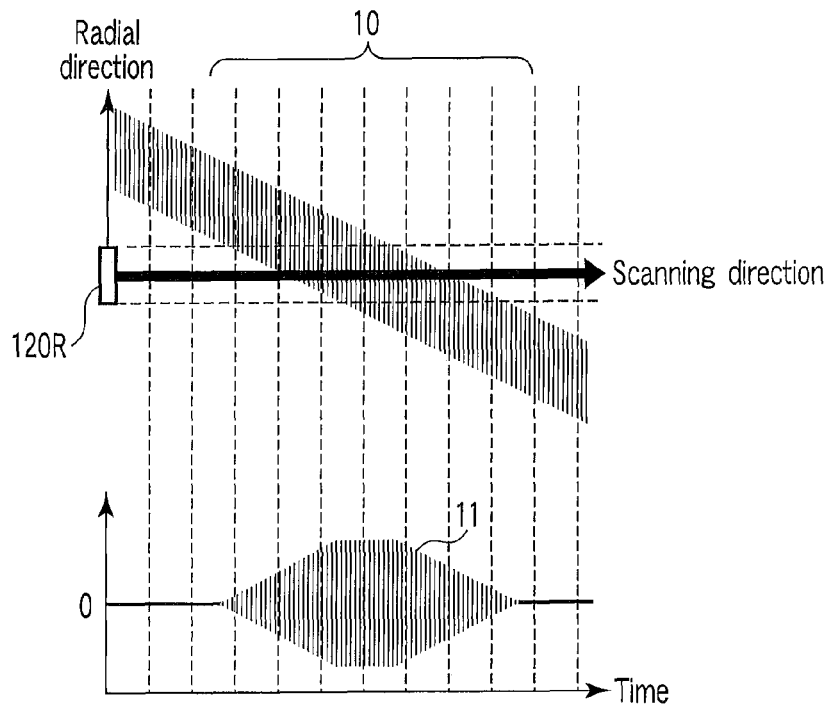
FIGS. 7A and 7B are diagrams explaining other detection signals that are generated when the multi-spiral servo pattern is read from the disk.
Figure 7B:
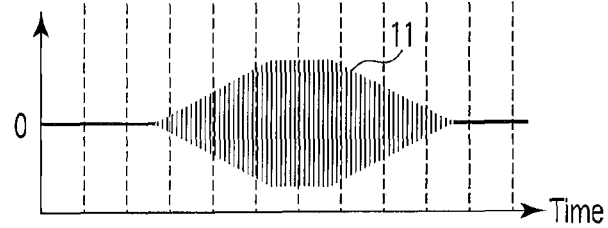

FIG. 6B is a diagram showing a detection signal 9 which the read head 120R should be generate upon reading a spiral servo pattern 8 shown in FIG. 6A if it had the same width as the write head 120W that has written the spiral servo pattern 8. As FIG. 6B shows, the signal 9 is shaped like a diamond. As in most cases, however, the read head 120R is less wide than the write head 120W that has written the spiral servo pattern 8. As a result, the signal 11 is shaped like a hexagon as is shown in FIG. 7B. FIG. 7A shows the spiral servo pattern 10 the read head 120R has read.

(Head Positioning Control)

A method of controlling the positioning of the head 120 in accordance with a hexagon-shaped detection signal 11 (i.e., burst-signal waveform) will be explained with reference to FIGS. 8 and 9, FIGS. 10A to 10C, FIGS. 11 to 14, and FIGS. 15A and 15B.

Figure 8:
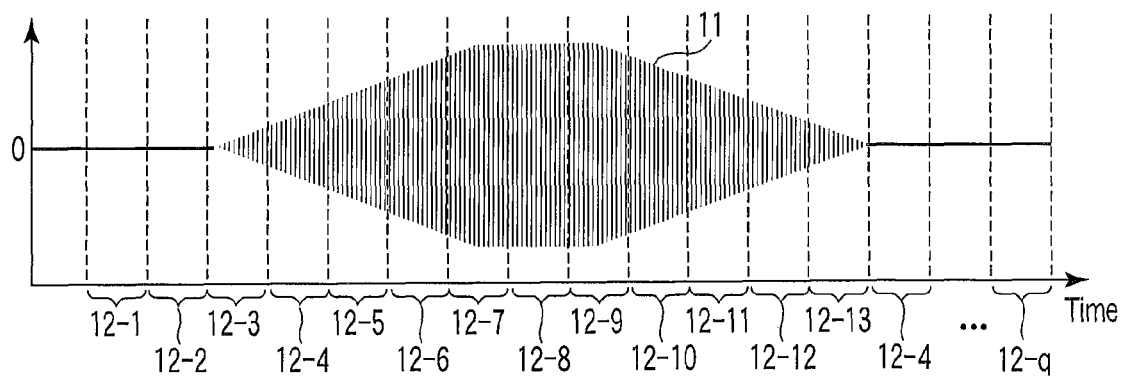
FIG. 8 is a diagram explaining a detection signal shaped like a hexagon.
Figure 9:
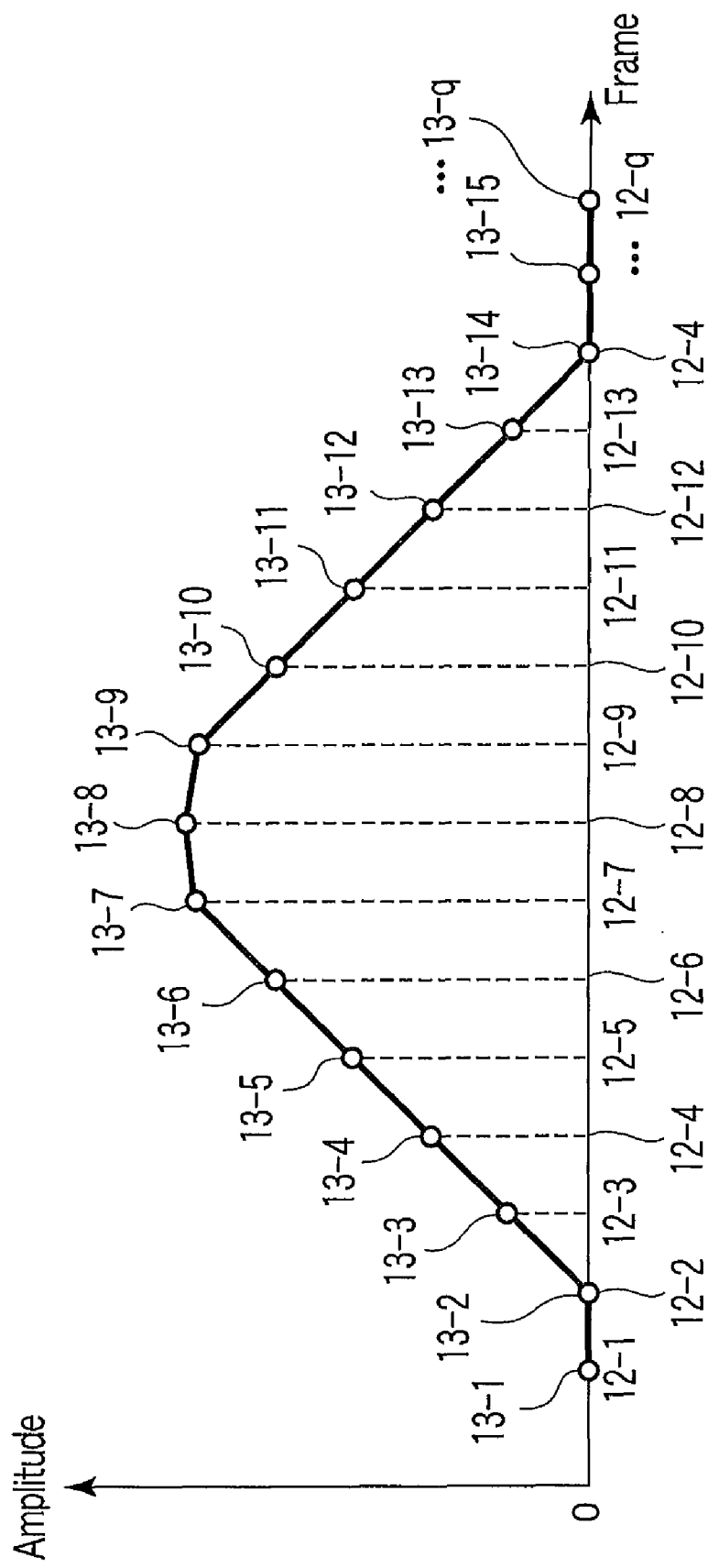
FIG. 9 is a diagram explaining a hexagon-shaped detection signal that pertains to the embodiment.

The disk drive 100 reproduces the hexagon-shaped detecting signal 11 (burst signal) from a multi-spiral servo pattern. More precisely, as shown in FIG. 8, the disk drive 100 reproduces the parts (frames 12-1 to 12-q) obtained by time-dividing the multi-spiral servo pattern in the scanning direction of the read head 120R. As FIG. 9 shows, the servo controller 160 generates amplitudes 13-1 to 13-q of the detecting signal 11 at timing of the frames 12-1 to 12-q.

Figures 10A, 10B, 10C:
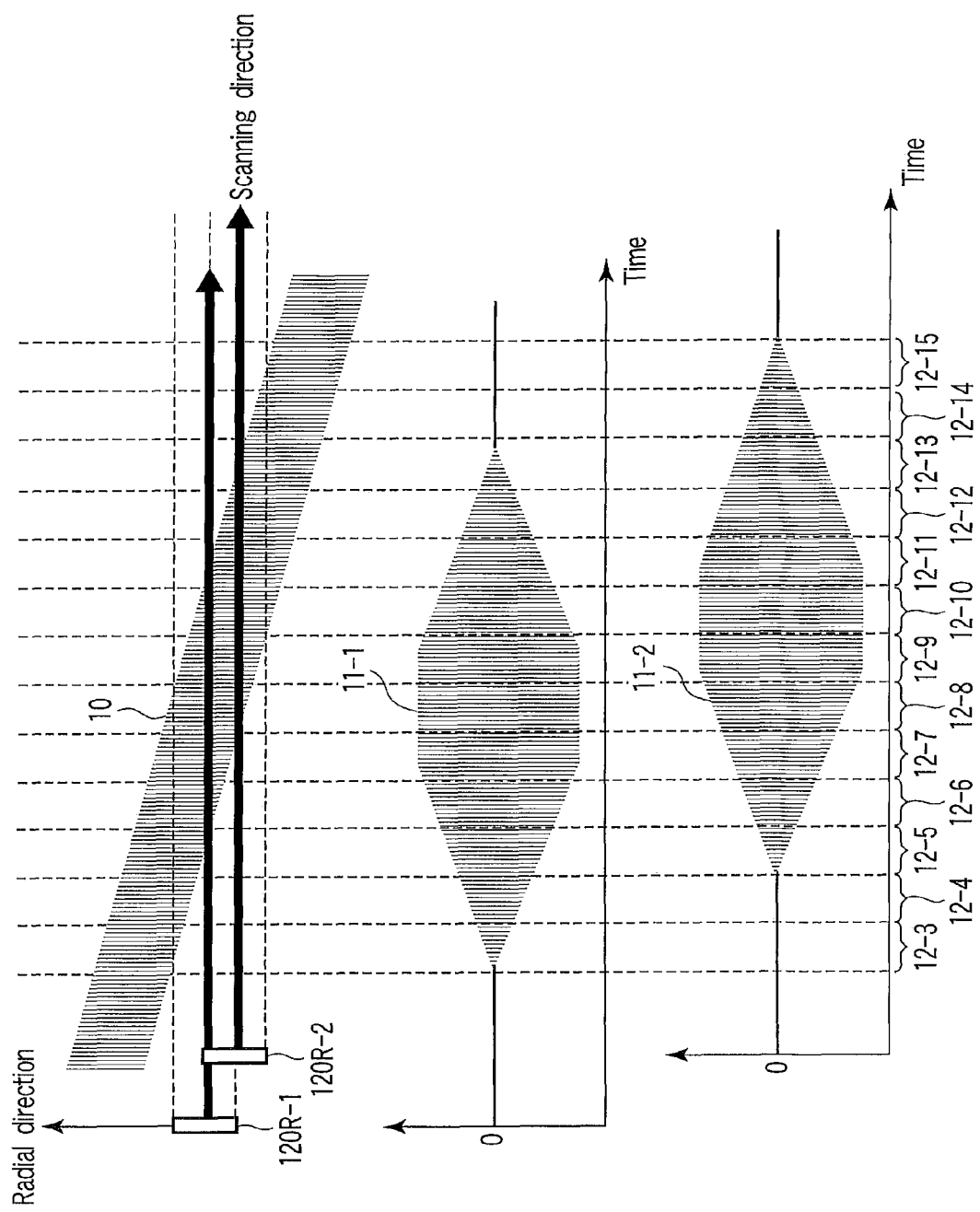
FIGS. 10A to 10C are diagrams illustrating how a hexagon-shaped detection signal changes in the embodiment.

FIGS. 10A to 10C are diagrams illustrating how the detection signal reproduced from the spiral servo pattern 10 if the read head 120R changes in position in the radial direction of the disk 1. When the read head 120R lies at position 120R-1, it generates a detection signal 11-1 that has such a waveform shown in FIG. 10B. When the read head 120R moves to position 120R-2, it generates a detection signal 11-2 that has such a waveform shown in FIG. 10C, which is hexagonal but shifted forward in time axis.

FIG. 11 is a diagram illustrating how hexagon-shaped detection signals for respective frames change in amplitude, as the read head 120R moves in the radial direction of the disk 1. In FIG. 11, the positions of the concentric tracks defined by the radial servo patterns are plotted on the horizontal axis. In other words, FIG. 11 shows how the detection signal read by the read head 120R changes in amplitude as the read head 120R reads the spiral servo pattern 10 while tracking the centerline of the concentric tracks.

Let us observe the amplitudes 13-5 and 13-11 of two frames that intersect near track N, at right angles with each other, and also the amplitudes 13-7 and 13-13 of respective two other frames that intersect near track N-1/2, at right angles with each other.

Figure 13:
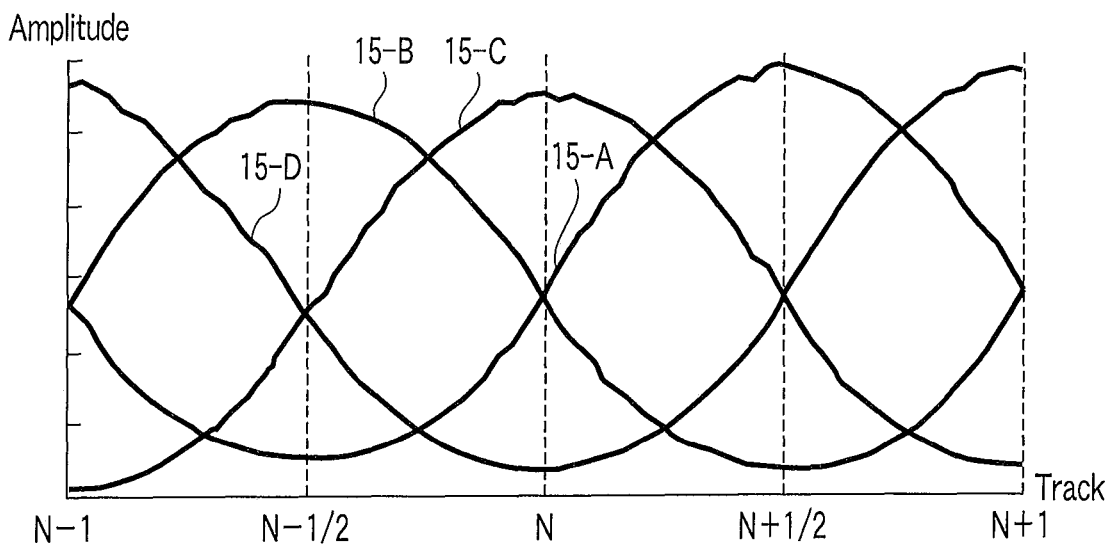
FIG. 13 is a diagram illustrating how hexagon-shaped detection signals change in amplitude with respect to a servo burst signal pertaining to the embodiment.

FIG. 12 is a diagram illustrating how the amplitudes 14-A to 14-D change, which pertain to four detection signals detected for four selected frames, respectively. FIG. 13 is a diagram illustrating how the amplitudes 15-A to 15-D of servo-burst signals A to D change as the read head 120R moves in the radial direction of the disk 1. The comparison of FIG. 12 and FIG. 13 reveals that the detection signals are similar to the servo-burst signals in terms of the intersecting points and the change in amplitude.

Figure 14:
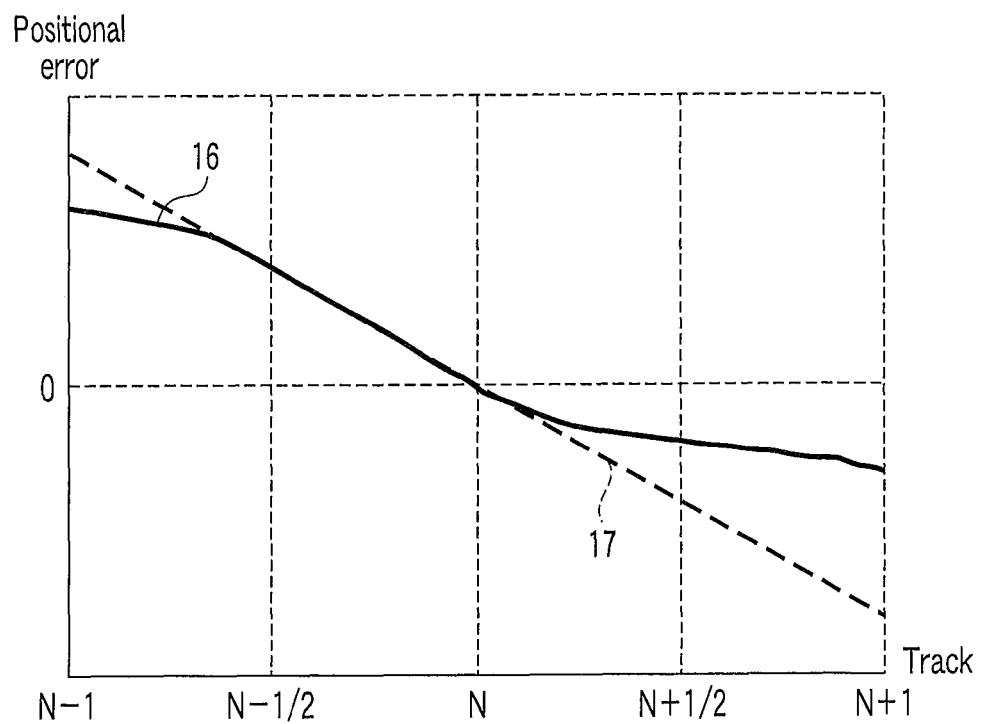
FIG. 14 is a diagram showing the linearity of a positional-error calculation performed in the embodiment.

FIG. 14 is a diagram in which the solid line 16 indicates the positional error calculated from the amplitudes 14-A to 14-D of detection signals detected for four selected frames, respectively. In FIG. 14, the broken line 17 indicates an ideal linearity for a positional-error calculation.

Using the amplitudes of the detection signals reproduced for frames, respectively, from the multi-spiral servo pattern, the CPU 170 performs a positional-error calculation based on the servo-burst signals A to D. In accordance with the result of this calculation, the CPU 170 controls the positioning (tracking) of the read head 120R.

More specifically, the CPU 170 performs an operation of the algorithm of the following equations (4) to (6) in order to find the positional error of the read head 120R:

$$pos1=(A-B)/(|A-B|+|C-D|) \quad (4)$$

$$pos2=((A-B)*|A-B|)/(|A-B|^2+|C-D|^2) \quad (5)$$

$$POS=((pos1*k)+((1024-k)*pos2))/1024 \quad (6)$$

Here, POS is a positional error obtained by performing an averaging operation in which a weighting coefficient (k: 0 to 1024) are added to the solutions of the equations (4) and (5). In the equations (4) and (5), A to D are the amplitudes of the servo-burst signals, |X| is the absolute value for X, Y^2 means the squaring of Y, and * means multiplication.

As seen from FIG. 14, the result of positional-error calculation (line 16) overlaps the ideal linear result (line 17), with respect to tracks N-1/2 to N. This means that the positional error the read head 120R can be accurately calculated and the frames can be well associated with the amplitudes A to D of the servo-burst signals, while the read head 120R is moving from tack N-1/2 to track N.

FIG. 15A shows a servo-burst signal 11 shaped like a hexagon. FIG. 15B is a diagram explaining a method of associating selected frames with the various amplitudes the signal 11 has.

As can be understood from FIGS. 15A and 15B, so long as the multi-spiral servo pattern remains unchanged (in width and slope), the selected frames can be associated with the amplitudes A to D of the servo-burst signal 11 even if the read head 120R moves from one track to another. The amplitudes A to D of the servo-burst signal 11 (hereinafter referred to as bursts A to D) are associated with the selected frames, using the number of the frame having the largest ($F_{MAX}$) of amplitudes 13-1 to 13-q.

Assume that frame No. 8 has the largest amplitude near track N. Then, frame No. 11 (=8+3) is associated with burst A, frame No. 5 (=8−3) is associated with burst B, frame No. 7 (=8−1) is associated with burst C, and frame No. 13 (=8+5) is associated with burst D.

Hence, as shown in FIG. 15B, $F_A = F_{MAX}+3$, $F_B = F_{MAX}-3$, $F_C = F_{MAX}-1$, and $F_D = F_{MAX}+5$, where $F_{MAX}$ is the frame for which the burst signal has the largest amplitude, and $F_A$, $F_B$, $F_C$ and $F_D$ are frames associated with the bursts A, B, C and D, respectively.

Thus, even if the read head 120R moves from one track to another, the bursts A to D of the burst signal can easily be associated with the frame numbers, merely by changing the frame having the largest amplitude.

(Correction of the Positional Error Calculated)

A process of correcting the positional error so calculated as explained above, when the position of the head 120 greatly change due to disturbance, will be described with reference to FIGS. 16A and 16B, FIGS. 17A and 17B, FIGS. 18A and 18B and FIGS. 19 and 20.

FIG. 16A shows a detection signal 11-1 the head 120 generates when is aligned with the centerline of a track. FIG. 16B shows the various amplitudes the detection signal 11-1 has. As FIG. 16 shows, the detection signal 11-1 has the largest amplitude 19-1 for frame $F_{MAX}$. For convenience of explanation, the amplitude of frame $F_{MAX}$ will be called Mag ($F_{MAX}$).

If the amplitude Mag($F_{MAX}$) of frame $F_{MAX}$ is larger than a prescribed threshold value M (indicated by the broken line in FIG. 16B), the CPU 170 determines that the position of the head 120 has not changed so greatly. That is, the read head 120R is determined to be at position 120R-1 as shown in FIG. 10A, reading the multi-spiral servo pattern.

Assume that disturbance develops in the disk drive 100, making the read head 120R move from position 120R-1 to position 120R-2 (FIG. 10A), deviating from the track centerline. In this case, shown in FIG. 17A, the detection signal 11-2 the read head 120R reads from the multi-spiral servo pattern shifts in time axis with respect to detection signal 11-1 that is shown in FIG. 16A. At this time, the CPU 170 detects that the read head 120R has greatly changed in position, because the amplitude 19-1 (Mag($F_{MAX}$)) of the frame becomes smaller than the prescribed threshold value M (broken line 18) as shown in FIG. 17B.

FIG. 18A shows detection signal 11-1 that the read head 120R generates when it undergoes no positional changes. In this case, the CPU 170 selects frames 14-A1 to 14-D1 (FA1 to FD1) corresponding to the burst signals (A to D) read from the radial servo patterns, using, as reference, the frame ($F_{MAX1}$) that imparts the maximum amplitude to detection signal 11-1. (See FIGS. 15A and 15B.) Using the amplitudes of these frames 14-A1 to 14-D1 (FA1 to FD1), the CPU 170 can find a positional error the read head 120R has with respect to the centerline of the track.

FIG. 18B shows a detection signal 11-2 the head 120 generates its position greatly changes. If the position of the head 120 greatly changes, the position of the read head 120R cannot be correctly calculated at frame 12-A1 to 12-D1 ($F_{A1}$ to $F_{D1}$), with the frame ($F_{MAX}$) used as reference, as has been described above.

Therefore, the CPU 170 searches for a frame ($F_{MAX2}$) at which the detection signal 11-2 acquires the maximum amplitude. Using the frame ($F_{MAX2}$), the CPU 170 selects frames 14-A1 to 14-D2 ($F_{A2}$ to $F_{D2}$) that correspond to the servo-burst signals (burst A to D) read from the radial servo patterns. In other words, the CPU 170 newly selects the frames corresponding to the burst A to D, in accordance with the amplitude of the detection signal 11-2 generated when the head position changes.

The CPU 170 performs positional-error calculation, using the amplitudes ($F_{A2}$ to $F_{D2}$) of the detection signals that correspond to the frames selected anew. FIG. 19 is a diagram explaining the result 20 of the positional-error calculation thus performed. That is, solid line 20 shown in FIG. 19 indicates the result of the positional-error calculation, obtained by changing the frames to be associated with the bursts A to D read from the radial servo patterns. Solid line 16 represents the result of a positional-error calculation performed when the head 120 undergoes no positional changes. Broken line 17 indicates an ideal result of the positional-error calculation, i.e., a positional error that linearly changes with the actual positional-error of the head 120. As evident from FIG. 19, the result 20 of the positional-error calculation greatly deviates from the actual positional error 17.

Therefore, the CPU 170 corrects the results of the positional-error calculation, adding to the result an offset based on the positional change of the head. More precisely, the CPU 170 performs the operation of (N/NT)*PEST+PES, where N is the difference ($F_{MAX1}-F_{MAX2}$) between the frame ($F_{MAX1}$) and the frame ($F_{MAX2}$), NT is the number of frames per track, which corresponds to the slope of the multi-spiral servo pattern, PEST is a positional error per track, and PES is the result 20 of positional-error calculation. The result of positional-error calculation, thus corrected, i.e., result 21 (including the offset), approximates the actual positional error 17 (shown in FIG. 20). That is, solid line 21 represents the result of the positional-error calculation in which an offset based on the positional change of the head is added to the result of positional-error calculation, which is indicated by solid line 20.

Using the amplitudes of the detection signals reproduced, for the respective frames, from the multi-spiral servo pattern, the CPU 170 performs a positional-error calculation based on the servo-burst signals A to D. Then, the CPU 170 controls the positioning of the read head 120R, in accordance with the result of this positional-error calculation. At this point, the head position may change due to disturbance. If this is the case, other frames are selected from the detection signals reproduced from the multi-spiral servo pattern. Using the amplitudes of these frames selected, the CPU 170 performs a positional-error calculation similar to the calculation that is based on the servo-burst signals A to D read from the radial servo patterns. Further, the CPU 170 adds an offset based on the positional change of the head, to the result of the positional-error calculation in which the amplitudes of the newly selected frames.

In the disk drive 100 according to the embodiment described above, a hexagonal-shaped detection signal can be reproduced from the multi-spiral servo pattern in order to control the head positioning during the self-servo write operation and can be applied to the positional-error calculation that uses the servo-burst signals A to D read from the radial servo patterns. Thus, a self-servo write operation can be accomplished, in which radial servo patterns that can constitute concentric tracks are written in the disk 1 having a multi-spiral servo pattern (i.e., base pattern), without the necessity of adding a special function to the disk drive 100.

Moreover, if the head position changes due to disturbance developing while the head is being positioned to write radial servo patterns, other frames are selected for use in the positional-error calculation, and the results of the positional-error calculation is corrected in accordance with the change in the head position. Hence, even if the head position greatly changes, the positioning of the head can be accurately controlled.

Thus, the embodiment can provide a disk drive in which the head positioning is controlled in accordance with a positional error calculated by using a detection signal the head generates upon reading the multi-spiral servo pattern recorded in the disk, and in which the head positioning can be accurately controlled even if the position of the head greatly changes.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
    a detecting unit configured to detect a positional change of a read head from the amplitude of a detection signal having a specific shape reproduced from a multi-spiral servo pattern recorded in a disk;
    a correcting unit configured to correct a positional error that is required in positioning the read head, based on the positional change detected by the detecting unit;
    a controller configured to control the positioning of the read head, by using the positional error corrected by the correcting unit; and
    a positional-error calculating unit configured to select those of frames obtained by dividing the detection signal at regular intervals, which are associated with servo-burst signals in the disk, in accordance with similarity in amplitude change, and to perform a positional-error calculation, using the amplitudes of the frames selected,
    wherein the correcting unit adds an offset determined from the positional change of the read head, to the result of the positional-error calculation.

2. The disk drive according to claim 1, wherein the correcting unit replaces the selected frames with other frames, in accordance with the positional change detected by the detecting unit, acquires the positional change of the head, which has been detected by using the amplitude of the frames selected anew, and corrects the result of the positional-error calculation in accordance with the positional change of the read head.

3. The disk drive according to claim 1, further comprising a reproducing unit configured to reproduce the detecting signal shaped like a hexagon from the multi-spiral servo pattern using the read head, while the read head is scanning circular regions equivalent to concentric tracks provided in the disk.

4. The disk drive according to claim 1, wherein the correcting unit determines an offset from the number of frames shifted when frames are selected anew in accordance with the positional change of the read head and a slope of the multi-spiral servo pattern, and adds the offset to the result of the positional-error calculation using the amplitudes of the frames selected anew.

5. The disk drive according to claim 1, wherein the positional-error calculating unit searches the frames obtained by dividing the detection signal at regular intervals, for a first reference frame that has a maximal amplitude, selects the frames associated with the servo-burst signals in accordance with the similarity in amplitude change, and performs the positional-error calculation, using the amplitudes of the frames thus selected.

6. The disk drive according to claim 5, wherein the correcting unit searches for a second reference frame that presents the maximal amplitude, based on the positional change detected by the detecting unit, and changes the frames, thereby selecting again the frames associated with the servo-burst signals, in accordance with the similarity in amplitude change by using the second reference frame as reference.

7. The disk drive according to claim 5, wherein the correcting unit searches for a second reference frame that presents the maximal amplitude, based on the positional change detected by the detecting unit, determines an offset from a difference between the first and second reference frames and a slope of the multi-spiral servo pattern, and adds the offset to the result of the positional-error calculation using the amplitudes of the frames selected anew.

8. A servo-writing method for use in a disk drive, the method comprising:
    detecting a positional change of a read head from the amplitude of the detection signal having a specific shape reproduced from a multi-spiral servo pattern recorded in a disk;
    correcting a positional error that is required in positioning the read head, based on the positional change detected;
    controlling the positioning of the read head, by using a result of the positional error corrected; and
    a positional-error calculating configured to calculate the positional-error by using servo-burst signals and to select those of frames obtained by dividing the detection signal at regular intervals, which are associated with servo-burst signals in the disk, in accordance with similarity in amplitude change, and by using the amplitudes of the frames selected,
    wherein the positioning of the read head is corrected by adding an offset determined from the positional change of the read head, to the result of the positional-error calculation.

9. The method according to claim 8, wherein the positional error is corrected by replacing the selected frames with other frames, in accordance with the positional change detected, and by acquiring the positional change of the head, which has been detected, using the amplitude of the frames selected anew, and by correcting the result of the positional-error calculation in accordance with the positional change of the head.

10. The method according to claim 8, wherein the positional error is corrected by determining an offset from the number of frames shifted when frames are selected anew in accordance with the positional change of the read head and a slope of the multi-spiral servo pattern, and by adding the offset to the result of the positional-error calculation using the amplitudes of the frames selected anew.

11. The method according to claim 8, further comprising reproducing configured to reproduce the detecting signal having the specific shape, from the multi-spiral servo pattern in the disk using the read head.

* * * * *